(12) United States Patent
Creel et al.

(10) Patent No.: US 6,889,766 B2
(45) Date of Patent: May 10, 2005

(54) METHODS FOR PASSING A SWELLING AGENT INTO A RESERVOIR TO BLOCK UNDESIRABLE FLOW PATHS DURING OIL PRODUCTION

(75) Inventors: Prentice G. Creel, Odessa, TX (US); Charles L. Boatman, Houston, TX (US); Sam W. McDonald, Midland, TX (US); Richard H. Tate, Brownfield, TX (US); Eldon Dwyann Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 28 days.

(21) Appl. No.: 10/375,205

(22) Filed: Feb. 27, 2003

(65) Prior Publication Data

US 2004/0168798 A1 Sep. 2, 2004

(51) Int. Cl.⁷ .............................................. E21B 33/13
(52) U.S. Cl. ...................... 166/270; 166/275; 166/400; 166/294
(58) Field of Search ................................ 166/270, 400, 166/275, 294, 295, 300

(56) References Cited

U.S. PATENT DOCUMENTS

| | | | |
|---|---|---|---|
| 3,202,214 A | 8/1965 | McLaughlin, Jr. ........... 166/30 |
| 3,376,926 A | 4/1968 | McLaughlin et al. .......... 166/29 |
| 3,556,221 A * | 1/1971 | Haws et al. .............. 166/305.1 |
| 4,120,361 A * | 10/1978 | Threlkeld et al. ............ 166/294 |
| 4,172,066 A * | 10/1979 | Zweigle et al. .............. 523/223 |
| 4,466,831 A | 8/1984 | Murphey ....................... 106/74 |
| 4,515,216 A | 5/1985 | Childs et al. ................ 166/293 |
| 4,572,295 A * | 2/1986 | Walley ........................ 166/295 |
| 4,579,668 A | 4/1986 | Messenger ............. 252/8.5 LC |
| 4,941,533 A * | 7/1990 | Buller et al. ................. 166/270 |
| 6,465,397 B1 * | 10/2002 | Patterson ..................... 507/222 |
| 6,508,306 B1 | 1/2003 | Reddy et al. ................ 166/295 |

FOREIGN PATENT DOCUMENTS

EP          0 566 118 B2    10/2001    ........... C08B/37/00

* cited by examiner

*Primary Examiner*—John Kreck
(74) *Attorney, Agent, or Firm*—Robert A. Kent; Rodney B. Carroll

(57) ABSTRACT

A method for recovering oil from a reservoir is provided. This method comprises passing a swelling agent into a permeable zone of the reservoir that allows fluid to flow between an injection well and a producing well. An aqueous solution is passed into the reservoir to contact the swelling agent, thereby causing the swelling agent to swell and substantially block the permeable zone. One or more injectants are passed into the reservoir to remove oil therefrom. The swelling agent inhibits the injectants from passing through the permeable zone, ensuring that the injectants pass through the areas of the reservoir containing oil.

20 Claims, No Drawings

METHODS FOR PASSING A SWELLING AGENT INTO A RESERVOIR TO BLOCK UNDESIRABLE FLOW PATHS DURING OIL PRODUCTION

CROSS-REFERENCE TO RELATED APPLICATIONS

Related applications filed concurrently herewith are U.S. patent application Ser. No. 10/375,183, filed Feb. 27, 2003 and entitled "Compositions and Methods of Cementing in Subterranean Formations Using a Swelling Agent to Inhibit the Influx of Water into a Cement Slurry," and U.S. patent application Ser. No. 10/375,203, filed Feb. 27, 2003 and entitled "Methods of Using a Swelling Agent to Prevent a Cement Slurry from being Lost to a Subterranean Formation," each of which is incorporated by reference herein in its entirety.

FIELD OF THE INVENTION

This invention generally relates to producing oil. More specifically, the invention relates to placing a swelling agent into permeable zones of an oil reservoir to block the flow paths of an injection fluid used to move the oil from the reservoir to a production well.

BACKGROUND OF THE INVENTION

Hydrocarbons in the form of oil are found in reservoirs in the earth. The oil is recovered by penetrating the reservoirs with well bores. Several stages may be used to produce the oil found in underground reservoirs. The first stage, which is known as the primary production stage, allows the oil to flow into the well bore under natural forces. At first, the natural forces in the reservoir may be sufficient to drive the oil to the surface where it is recovered. However, at some point, pumps may be required to displace the oil from the well bore to the surface. The primary production stage usually yields only about 5% to 15% of the oil in the reservoir.

A secondary recovery operation thus is commonly performed to recover additional amounts of the oil from the reservoir. A common secondary recovery operation known as secondary flooding involves injecting a fluid such as water into a so-called injection well (or wells) to drive oil in the reservoir to a second well (or set of wells) known as the producing well. Secondary flooding usually recovers up to an additional 50% of the original oil in the reservoir. However, a large portion of the original oil often remains in the reservoir even after secondary flooding. As such, tertiary recovery operations have been developed to increase the amount of oil recovered from the reservoir. One common tertiary recovery operation, which is known as tertiary flooding, employs yet another fluid, e.g., a fluid that is miscible or partially miscible with the reservoir oil, to drive the oil from the reservoir to the producing well.

As is known in the art, oil reservoirs often contain fractures, vugs, voids, fissures, and high permeability streaks that form so-called least resistant flow paths (or permeable zones) between the injection well and the production well. During secondary or tertiary flooding the injectant, i.e., the fluid injected into the injection well to drive the oil to the production well, tends to pass through the more permeable zones, bypassing the less permeable zones and thus leaving significant amounts of oil in the reservoir. In addition, the pressure drop across the reservoir required to enhance the displacement of oil from the reservoir often cannot be achieved due to the presence of the more permeable zones. The amount of oil displaced by the injectant is thus reduced, resulting in a reduction in the sweep efficiency of the injectant. As the injectant continues to pass through the more permeable zones, the rock structure within those zones erodes, thus exasperating the problem. Moreover, the permeable zones may allow the injectant to prematurely communicate with the production well, resulting in the recovery of the injectant rather than the oil. Therefore, the fractures, vugs, voids, fissures, and high permeability streaks in the reservoir undesirably limit the amount of oil that can be produced.

A need therefore exists to develop a method for blocking the permeable zones in an oil reservoir to thereby improve the sweep efficiency of an injectant used during recovery operations. Blocking the permeable zones would also allow a desired pressure drop across the reservoir to be attained. As a result, oil production could be increased despite the presence of fractures, vugs, voids, fissures, and high-permeability streaks in the reservoir.

SUMMARY OF THE INVENTION

The present invention includes methods of recovering oil from a reservoir. The methods comprise passing a swelling agent into a permeable zone of the reservoir that allows fluid to flow between the injection well and a producing well. The swelling agent may be combined with a carrier fluid before passing the swelling agent into the reservoir. An aqueous solution is passed into the reservoir to contact the swelling agent, thereby causing the swelling agent to swell and substantially block the permeable zone. The aqueous solution may serve as the carrier solution such that the swelling agent and the aqueous solution are concurrently passed into the reservoir. Alternatively, the carrier solution may be a non-aqueous fluid such that the swelling agent and the carrier solution are passed into the reservoir before the aqueous solution is passed into the reservoir.

One or more injectants are passed into the reservoir to remove oil therefrom. The injectant may be the aqueous solution employed to cause the swelling of the swelling agent. Alternatively, the injectant may be a gas such as carbon dioxide. The swelling agent inhibits the injectants from passing through the permeable zone, ensuring that the injectants pass through the areas of the reservoir containing oil.

DETAILED DESCRIPTION OF THE PREFERRED EMBODIMENTS

According to the present invention, methods are performed to recover hydrocarbons, particularly oil, from a reservoir. Well bores may be drilled through the earth to penetrate the reservoir. Various completion techniques, which are known in the art, may be used to form one or more injection wells and one or more production wells in the well bores. The injection wells and the production wells are strategically placed in communication with the reservoir such that a fluid injected into the injection wells can pass through the reservoir to the production wells, driving at least a portion of the oil in the reservoir to the production wells.

A primary production stage may be employed to recover a portion of the oil in the reservoir. Natural pressures may be relied on to drive a portion of the oil from the reservoir to the surfaces of the production wells. After the natural pressures become insufficient to convey the oil to the production well surfaces, pumps may be placed in the production wells to displace the oil therein to the surfaces. Eventually the pumps no longer yield a significant amount of oil, and the primary production stage is terminated.

In an embodiment, a swelling agent is passed to one or more permeable zones in the oil-containing reservoir via one or more wells, preferably via one or more injection wells after termination of the primary production stage. Examples of permeable zones that the swelling agent may enter include fractures, vugs, voids, fissures, and high-permeability streaks. An aqueous fluid is also passed into the injection well such that it contacts the swelling agent. As a result of being contacted with an aqueous fluid, the swelling agent swells to form a gel mass that substantially plugs one or more of the permeable zones in the reservoir. Preferably, the swelling agent is insoluble in water and thus avoids becoming diluted and washed away by the aqueous solution and/or subsequent injectants.

Secondary and/or tertiary flooding operations may also be performed by displacing one or more injectants into an injection well and through the reservoir to drive additional oil from the reservoir to the production wells. The presence of the swelling agent in the permeable zones serves to substantially block the flow pathways of the injectants through the permeable zones. The swelling agent may be passed into the reservoir concurrently with, or preferably prior to, the displacing injectants. The displacing injectants thus do not prematurely pass through the permeable zones to the production wells before having passed through areas of the reservoir containing oil. As such, the sweep efficiency by which the injectants displace oil from the reservoir to the production wells is relatively high. Further, the reservoir pressure is maintained at a sufficient level to assist the displacement of the oil. The secondary and tertiary production rates and the amount of oil recovered from the reservoir depend upon a number of factors such as the efficiency of the flood mechanism, the properties of the rocks in the reservoir, the properties of the injectants, well locations, and the structural relief It is to be understood that additional flooding operations may be performed as deemed appropriate by one skilled in the art.

Prior to passing the swelling agent into the injection wells, various evaluation techniques can be used singly or in combination to detect the presence of permeable zones in the reservoir. Any suitable means or methods for detecting and locating such permeable zones may be used as known to those of skill in the art. For example, tracer surveys and interference and pulse testing can be used to verify communication between wells and to determine the flow capacity of permeable zones. Reservoir description and monitoring can be used to track the movement of fluids in the reservoir. Also, coring and pressure transient testing of individual zones can be used to determine permeability variations between zones. Other evaluation techniques would be apparent to one skilled in the art.

Detecting the locations of permeable zones in the reservoir allows the swelling agent to be strategically placed within and/or in close proximity to those zones. Preferably, the swelling agent does not immediately absorb water but begins to absorb water after there has been sufficient time to place it within and/or in close proximity to a permeable zone. While downhole, the swelling agent begins to absorb the water and swell into a gel mass that is substantially resistant to the flow of fluid therethrougb, thereby effectively plugging the fractures, vugs, voids, fissures, and high permeability streaks through which fluids could otherwise pass. The swelling agent can withstand a relatively large amount of pressure and thus resists being dislodged from its position.

The swelling agent is defined as and may be any suitable material that absorbs water and swells (i.e., expands) as it absorbs the water. Preferably, the swelling agent is insoluble in water and thus avoids becoming diluted and washed away by the water or other injectants flowing through the well bore. More preferably, the swelling agent forms a gel mass upon swelling effective for blocking a flow path of fluid through a permeable zone. Most preferably, the gel mass has a relatively low permeability to water and/or other injectant fluids, and thus creates a barrier to the flow of such fluids through a permeable zone. A gel is herein defined as a crosslinked polymer network swollen in a liquid. Preferably, the crosslinker is part of the polymer and thus will not absorb out of the polymer. Suitable swelling agents include those known as superabsorbents, which are commonly used in absorbent products such as diapers, training pants, and feminine care products. Superabsorbents are swellable crosslinked polymers, which have the ability to absorb and store many times their own weight of aqueous liquids by forming a gel. The superabsorbents retain the liquid that they absorb and typically do not release the liquid, even under pressure. Examples of superabsorbents are sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid.

Examples of suitable swelling agents include, but are not limited to, polyacrylamide, polyacrylate, hydrolyzed polyacrylonitrile, carboxyalkyl cellulose, carboxymethyl starch, salts of carboxymethyl cellulose, carboxyalkyl polysaccharide, and combinations thereof. The swelling agent is preferably a crystalline polymer that has been dehydrated, more preferably a crosslinked polyacrylamide, and most preferably a crosslinked polyacrylamide in the form of a hard crystal.

A crosslinked polyacrylamide known as DIAMOND SEAL polymer may be purchased from Baroid Drilling Fluids, Inc. The DIAMOND SEAL polymer is available in grind sizes of 1 mm, 4 mm, and 14 mm and may be ground even smaller if needed. For example, a smaller grind size may be required to allow the DIAMOND SEAL polymer crystals to enter very small fractures, fissures, and so forth. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, DIAMOND SEAL polymer can withstand temperatures up to at least 250° F. without experiencing breakdown and thus may be used in the majority of locations where oil reservoirs are found. Other suitable swelling agents are described in European Patent No. 0566118, which is incorporated by reference herein.

The swelling agent is preferably hydrophilic and is thus physically attracted to water molecules. In the case where the swelling agent is a crystalline polymer, the polymer chain deflects and surrounds the water molecules during water absorption. In effect, the polymer undergoes a change from that of a dehydrated crystal to that of a hydrated gel as it absorbs water. Once fully hydrated, the gel preferably exhibits a high resistance to the migration of water or therethrough. That is, the molecules of the gel are sufficiently packed together to substantially inhibit water from passing through the gel. Further, the gel can plug permeable zones in the reservoir because it can withstand substantial amounts of pressure without being dislodged or extruded.

As the swelling agent undergoes hydration, its physical size increases by about 10 to 400 times its original weight. The amount and rate by which the swelling agent increases in size vary depending upon its temperature, its grain size, and the ionic strength of the carrier fluid. The temperature of a well generally increases from top to bottom such that the rate of swelling increases as the swelling agent passes downhole. The rate of swelling also increases as the grain size of the swelling agent decreases and as the ionic strength of the carrier fluid decreases. For example, the mass of the DIAMOND SEAL polymer in a 14 mm grind size increases by 0% in 20 minutes after contacting water, 150% in 35 minutes after contacting water, and 400% in 45 minutes after contacting water at 80° F. The mass of the DIAMOND SEAL polymer increases by 0% in 15 minutes after contacting water, 200% in 25 minutes after contacting water, and 400% in 35 minutes after contacting water at 145° F. The mass of the DIAMOND SEAL polymer increases by 0% in 45 minutes after contacting 9.2 pounds/gallon (ppg) Brine Water, 25% in 60 minutes after contacting 9.2 ppg Brine Water, and 50% in 75 minutes after contacting 9.2 ppg Brine Water at 80° F. The mass of the DIAMOND SEAL polymer increases by 0% in 30 minutes after contacting 9.2 ppg Brine Water, 25% in 45 minutes after contacting 9.2 ppg Brine Water, and 50% in 60 minutes after contacting 9.2 ppg Brine Water at 145° F. It will be understood that % indicates percent throughout the present specification.

According to some embodiments, the swelling agent may be combined with a carrier fluid to form a carrier solution before being placed in a well bore. The carrier fluid may be any suitable fluid for moving the swelling agent to desired locations in the reservoir. The swelling agent is incorporated therein in an effective amount for plugging a permeable zone upon being placed down hole and into the reservoir and the effective amount may vary depending on factors such as the type of the carrier fluid, the size of a fracture, fissure, etc., and the like. The carrier fluid is preferably a pumpable fluid. Examples of carrier fluids with which the swelling agent may be combined include but are not limited to fresh water, deionized water, brine water of varying salinity, chloride solutions such as calcium dichloride and potassium chloride solutions, hydrocarbons such as produced oil and diesel oil, and synthetic fluids such as ester or polymer based fluids. The amount of swelling agent that may be combined with the carrier fluid depends on a number of factors including the type of carrier fluid. In general, the carrier fluid may contain about from about 0.001 to about 5.0 pounds swelling agent/gallon carrier fluid, more preferably from about 0.01 to about 2.0 ppg. Preferably, the carrier fluid containing the swelling agent remains sufficiently non-viscous in order to be displaced to the permeable areas of the reservoir. Thus, there is no need to apply higher pressure that could damage the rock structure surrounding the reservoir in an attempt to force the swelling agent into the permeable areas.

The injectants may be any suitable fluids for causing movement of oil in the flow direction of the fluids as they pass from an injection well through a reservoir containing the oil to a production well. Examples of suitable injectants include aqueous solutions such as fresh water and brine and gases such as carbon dioxide.

In preferred embodiments, an aqueous solution serves as both the carrier fluid and an injectant. The swelling agent may be introduced to an injectant stream as it is being pumped into an injection well such that the injectant stream also acts the carrier fluid for the swelling agent. Because the injectant/carrier fluid is an aqueous solution, no additional step is required to contact the swelling agent with an aqueous solution to cause the swelling agent to swell. In alternative embodiments, the carrier solution is a non-aqueous solution such as a hydrocarbon, and the injectant is an aqueous solution. As such, the swelling agent is combined with the carrier solution before displacing the resulting mixture through an injection well and into the reservoir. The injectant is then displaced to the reservoir to cause the swelling agent to swell and to drive oil from the reservoir to the production wells. In other embodiments, the carrier solution is a non-aqueous solution, and the injectant is a gas. After combining the swelling agent with the carrier fluid and passing the resulting mixture to the reservoir via an injection well, an aqueous solution is passed into the injection well so as to contact the swelling agent. Then the injectant is displaced into the injection well to drive oil from the reservoir to the production wells.

In each of the embodiments above, the amount of oil production may be monitored to determine if more swelling agent should be added to the reservoir to block additional permeable areas and thus improve production. If needed, one of the embodiments described above may be performed to introduce additional swelling agent to the reservoir. This procedure may be repeated until the amount of swelling agent is sufficient to achieve the desired amount of production. One or a plurality of injectants, in combination or in sequence, may be displaced into an injection well to drive additional oil from the reservoir to the production wells.

If desired, the swelling agent may be removed from the reservoir or area of placement after it has been used for its intended purpose. If the swelling agent is a polymer, the backbone structure of the polymer may be broken down such that it becomes more like a liquid. Any known means may be used to break down or collapse the polymer. For example, the polymer may be contacted with an oxidizer such as sodium hypochlorite (i.e., bleach) to eliminate the polymer from the reservoir, preferably by pumping such compounds down the well bore and contacting the swollen swelling agent in situ.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLE 1

As shown in Table 1 below, the DIAMOND SEAL polymer was mixed with different carrier solutions to form several test samples. These carrier solutions were fresh water, field produced brine water, and $CaCl_2$ aqueous solution made by adding $CaCl_2$ to fresh water. Each sample was then observed at room temperature to determine the swelling time and volume change of the DIAMOND SEAL polymer as a result of its absorption of water. Table 1 below shows the results of this example.

TABLE 1

| Samples | Swelling Time | Volume Change [crystal to gel volume ratio swelling] |
|---|---|---|
| Fresh Water Carrier Solution | | |
| 1 gram DS/400 grams H$_2$O | 20–25 mins. | 100–400 |
| Field Produced Brine Water Carrier Solution | | |
| 1 gram DS/400 grams H$_2$O | 40–50 mins. | 10–100 |
| CaCl$_2$ Carrier Solution | | |
| 8.5 ppg. CaCl$_2$ solution | >1 hr. | 50–200 |
| 9.0 ppg. CaCl$_2$ solution | 1.5 hrs. | 10–100 |
| 9.5 ppg. CaCl$_2$ solution | 2 hrs. | 5–50 |
| 10.0 ppg. CaCl$_2$ solution | 2.5 hrs. | 5–25 |
| 10.2 ppg CaCl$_2$ solution | 5.5 hrs. | 5–15 |
| 10.3 ppg CaCl$_2$ solution | 7 hrs. | 5–10 |
| 10.5 ppg CaCl$_2$ solution | 13 hrs. | 5–10 |

Based on these results, the swelling time of the DIAMOND SEAL polymer varied depending on the ionic strength of carrier fluid being used. In particular, the swelling time increased as the carrier fluid changed from fresh water to brine water and from brine water to a CaCl$_2$ solution. As such, a CaCl$_2$ solution can be used as the carrier fluid when a relatively long swelling time is desired. Increasing the weight of the CaCl$_2$ solution caused the swelling time to increase and the volumetric change to decrease. In addition, the volume change of the DIAMOND SEAL polymer appeared to be greatest when the carrier solution was fresh water.

EXAMPLE 2

The DIAMOND SEAL polymer was mixed with fresh water such that the water contained 0.2 lb DS/gallon water. Several samples (samples 1–4) of the resulting mixture were then allowed to hydrate at room temperature (70° F.) and at 110° F. to determine the expansion rate of the DIAMOND SEAL polymer at the different temperatures. Table 2 below shows the results of this example.

TABLE 2

| Sample | Temperature, ° F. | Expansion in Size |
|---|---|---|
| 1 | 70 | 100% in 30 min. |
| 2 | 110 | 100% in 30 min. |
| 3 | 70 | 200% in 2 hours |
| 4 | 110 | 200% in 1 hour |

Based on the results shown in Table 2, the expansion rates of the DIAMOND SEAL polymer were initially the same at room temperature (70° F.) and at the bottom hole test temperature (110° F.). In particular, samples 1 and 2 both expanded by 100% for the first 30 minutes. However, the expansion rate of the DIAMOND SEAL polymer at the higher temperature later became greater than that of the DIAMOND SEAL polymer at room temperature. In particular, sample 3 took 2 hours to expand by 200%, whereas sample 4 took 1 hour to expand by 200%.

EXAMPLE 3

As shown in Table 3 below, different grind sizes of the DIAMOND SEAL polymer (DS) were mixed with various carrier solutions at different concentrations to form several test samples. These carrier solutions were fresh water, field produced brine water, NaCl brine made by adding NaCl to fresh water, and CaCl$_2$ aqueous solution made by adding CaCl$_2$ to fresh water. The test samples were then subjected to different temperatures and observed to determine the swelling time and the amount of swelling of the DIAMOND SEAL polymer. Table 3 below shows the results of this example.

TABLE 3

| DIAMOND SEAL Polymer Grind Size | Carrier Fluid | Concentration of DS in Carrier Fluid | Temp., ° F. | Initial Hydration, hr.:min. | Final Hydration, hr.:min. | Swelling, Increase, % By Volume |
|---|---|---|---|---|---|---|
| 425–1000 microns | Fresh Water | 0.2 lb/gal (ppg) | 80 | 0:09 | 0:15 | 400 |
| | | 0.4 ppg | 80 | 0:09 | 0:15 | 400 |
| | | 0.5 ppg | 80 | 0:09 | 0:15 | 400 |
| 425–1000 microns | Fresh Water | 0.2 ppg | 120 | 0:03 | 0:09 | 400 |
| | | 0.4 ppg | 120 | 0:03 | 0:09 | 400 |
| | | 0.5 ppg | 120 | 0:03 | 0:09 | 400 |
| 4 mm | Fresh Water | 0.2 ppg | 80 | 0:18 | 0:25 | 500 |
| | | 0.4 ppg | 80 | 0:18 | 0:25 | 500 |
| | | 0.5 ppg | 80 | 0:18 | 0:25 | 450 |
| 4 mm | Fresh Water | 0.2 ppg | 120 | 0:14 | 0:20 | 500 |
| | | 0.4 ppg | 120 | 0:14 | 0:20 | 450 |
| | | 0.5 ppg | 120 | 0:14 | 0:20 | 400 |
| 14 mm | Fresh Water | 0.2 ppg | 80 | 0:20 | 0:30 | 500 |
| | | 0.4 ppg | 80 | 0:20 | 0:25 | 450 |
| | | 0.5 ppg | 80 | 0:20 | 0:25 | 400 |
| 14 mm | Fresh Water | 0.2 ppg | 120 | 0:17 | 0:25 | 500 |
| | | 0.4 ppg | 120 | 0:16 | 0:25 | 450 |
| | | 0.5 ppg | 120 | 0:16 | 0:25 | 400 |
| 425–1000 microns | Brine Water, 9.5 ppg | 0.2 ppg | 80 | 0:25 | 0:28 | 150 |
| | | 0.4 ppg | 80 | 0:20 | 0:28 | 125 |
| 425–1000 microns | Brine Water, 9.5 ppg | 0.2 ppg | 120 | 0:15 | 0:25 | 150 |
| | | 0.4 ppg | 120 | 0:15 | 0:25 | 125 |
| 4 mm | Brine Water, 9.5 ppg | 0.5 ppg | 80 | 0:20 | 0:33 | 150 |
| | | 1.0 ppg | 80 | 0:20 | 0:30 | 100 |
| 4 mm | Brine Water, 9.5 ppg | 0.5 ppg | 120 | 0:18 | 0:30 | 175 |
| | | 1.0 ppg | 120 | 0:18 | 0:27 | 150 |
| 14 mm | Brine Water, 9.5 ppg | 0.5 ppg | 80 | 0:25 | 0:40 | 150 |
| | | 1.0 ppg | 80 | 0:25 | 0:45 | 100 |
| 14 mm | Brine Water, 9.5 ppg | 0.5 ppg | 120 | 0:20 | 0:35 | 150 |
| | | 1.0 ppg | 120 | 0:20 | 0:35 | 125 |
| 425–1000 microns | Brine Water, 10.0 ppg | 0.2 ppg | 80 | 0:35 | 0:40 | 125 |
| | | 0.4 ppg | 80 | 0:30 | 0:40 | 100 |
| 425–1000 microns | Brine Water, 10.0 ppg | 0.2 ppg | 120 | 0:20 | 0:35 | 150 |
| | | 0.4 ppg | 120 | 0:20 | 0:35 | 100 |
| 4 mm | Brine Water, 10.0 ppg | 0.5 ppg | 80 | 0:25 | 0:45 | 100 |
| | | 1.0 ppg | 80 | 0:25 | 0:45 | 50 |
| 4 mm | Brine Water, 10.0 ppg | 0.5 ppg | 120 | 0:30 | 0:55 | 100 |
| | | 1.0 ppg | 120 | 0:30 | 0:55 | 50 |
| 14 mm | Brine Water, 10.0 ppg | 0.5 ppg | 80 | 0:25 | 0:45 | 100 |
| | | 1.0 ppg | 80 | 0:25 | 0:45 | 50 |

TABLE 3-continued

| DIAMOND SEAL Polymer Grind Size | Carrier Fluid | Concentration of DS in Carrier Fluid | Temp., °F. | Initial Hydration, hr.:min. | Final Hydration, hr.:min. | Swelling, Increase, % By Volume |
|---|---|---|---|---|---|---|
| 14 mm | Brine Water, 10.0 ppg | 0.5 ppg | 120 | 0:25 | 0:55 | 100 |
| 14 mm | Brine Water, 10.0 ppg | 1.0 ppg | 120 | 0:25 | 0:55 | 50 |
| 4 mm | 1 wt. % NaCl Brine | 4 lbs/barrell (ppb) (11.43 kg/m³) | Ambient (~20° C.) | 0:30 | 0:60 | 300 |
| 14 mm | 1 wt. % NaCl Brine | 4 ppb (11.43 kg/m3) | Ambient (~20° C.) | 0:30 | 0:60 | 275 |
| 4 mm | 2 wt. % NaCl Brine | 4 ppb (11.43 kg/m3) | Ambient (~20° C.) | 0:40 | 0:60 | 250 |
| 14 mm | 2 wt. % NaCl Brine | 4 ppb (11.43 kg/m3) | Ambient (~20° C.) | 0:40 | 1:20 | 235 |
| 4 mm | 3 wt. % NaCl Brine | 4 ppb (11.43 kg/m3) | Ambient (~20° C.) | 0:45 | 1:45 | 215 |
| 14 mm | 3 wt. % NaCl Brine | 4 ppb (11.43 kg/m3) | Ambient (~20° C.) | 0:45 | 1:45 | 200 |
| 4 mm | 8.5 ppg CaCl$_2$ solution | 0.2 ppg | Ambient (~20° C.) | >1 hr. | 2:0 | 200 |
| 4 mm | 9.0 ppg CaCl$_2$ solution | 0.2 ppg | Ambient (~20° C.) | 1:30 | 3:0 | 100 |
| 4 mm | 9.5 ppg CaCl$_2$ solution | 0.2 ppg | Ambient (~20° C.) | 2:0 | 4:0 | 125 |
| 4 mm | 10.0 ppg CaCl$_2$ solution | 0.2 ppg | Ambient (~20° C.) | 2:30 | 5:0 | 50 |
| 4 mm | 10.2 ppg CaCl$_2$ solution | 0.2 ppg | Ambient (~20° C.) | 5:30 | 1:0 | 25 |
| 4 mm | 10.3 ppg CaCl$_2$ solution | 0.2 ppg | Ambient (~20° C.) | 7:0 | 9:0 | 10 |
| 4 mm | 10.5 ppg CaCl$_2$ solution | 0.2 ppg | Ambient (~20° C.) | 13:0 | 24:0 | 10 |
| 4 mm | 11.0 ppg CaCl$_2$ solution | 0.2 ppg | Ambient (~20° C.) | | | did not swell |

As in Example 1, the swelling time of the DIAMOND SEAL polymer varied depending on the ionic strength of the carrier fluid being used. In particular, the time required for the DIAMOND SEAL polymer to swell, i.e., the swelling time, increased as the carrier fluid changed from fresh water to brine water and from brine water to a CaCl$_2$ solution. In contrast, the DIAMOND SEAL polymer experienced the most amount of swelling in the fresh water and the least amount of swelling in the CaCl$_2$ solution, indicating that it absorbs more water when in fresh water than in water containing salts. Further, the amount of swelling generally decreased as the concentration of the DIAMOND SEAL polymer in the carrier fluid increased. In addition, the swelling time generally increased as the grind size of the DIAMOND SEAL polymer increased, whereas the swelling time generally decreased as the temperature increased.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of recovering oil from a reservoir, comprising:
    (a) passing a swelling agent into a permeable zone of the reservoir, wherein the swelling agent is greater than or equal to about 1 mm in size;
    (b) passing an aqueous solution into the reservoir to contact the swelling agent, thereby causing the swelling agent to swell and reduce fluid flow through the permeable zone; and
    (c) passing an injectant into the reservoir to remove the oil from the reservoir.

2. The method of claim 1 wherein the swelling agent is a crystalline polymer.

3. The method of claim 1 wherein the swelling agent is selected from the group consisting of polyacrylamide, polyacrylate, hydrolyzed polyacrylonitrile, carboxylalkyl cellulose, carboxymethyl starch, salts of carboxymethyl cellulose, carboxyalkyl polysaccharide, and combinations thereof.

4. The method of claim 2 wherein the crystalline polymer is a crosslinked polyacrylamide.

5. The method of claim 1 wherein the swelling agent swells to form a gel mass that substantially blocks a flow path of the injectant through the permeable zone.

6. The method of claim 1 wherein the swelling of the swelling agent is delayed until the swelling agent is downhole.

7. The method of claim 1, further comprising combining the swelling agent with a carrier solution before passing the swelling agent into the reservoir.

8. The method of claim 7 wherein the carrier solution is the injectant.

9. The method of claim 7 wherein the carrier solution is the aqueous solution, and wherein the swelling agent and the aqueous solution are concurrently passed into reservoir.

10. The method of claim 7 wherein the carrier solution is a non-aqueous fluid, and wherein the swelling agent and the carrier solution are passed into the reservoir before the aqueous solution is passed into the reservoir.

11. The method of claim 7 wherein the carrier solution comprises at least one of fresh water, brine water, a potassium chloride solution, a calcium chloride solution, a hydrocarbon, a synthetic fluid, or combinations thereof.

12. The method of claim 7 wherein the swelling agent is present in the carrier solution in an amount ranging from about 0.001 to about 5.0 pounds/gallon.

13. The method of claim 7 wherein the swelling agent is present in the carrier solution in an amount ranging from about 0.01 to about 2.0 pounds/gallon of the carrier solution.

14. The method of claim 1 wherein the injectant is selected from the group consisting of the aqueous solution, carbon dioxide, and combinations thereof.

15. The method of claim 1, further comprising removing the swelling agent from the reservoir.

16. The method of claim 15 wherein said removing the swelling agent from the well bore comprises contacting the swelling agent with an oxidizer.

17. The method of claim 16 wherein the oxidizer is sodium hypochlorite.

18. The method of claim 1 wherein fluid flows in the reservoir from an injection well to a production well.

19. The method of claim 18 wherein the flow of the injectant from the injection well to the production well enhances recovery of the oil.

20. The method of claim 1 wherein an amount by which the swelling agent increases in size as it swells decreases as an ionic strength of the aqueous solution increases.

* * * * *